United States Patent [19]

Ford et al.

[11] 4,260,442
[45] Apr. 7, 1981

[54] METHOD FOR MAKING AN IMPROVED VARIABLE FLUTE CONTAINER

[75] Inventors: Mack L. Ford, Westerville; William W. McFarland, Wooster, both of Ohio

[73] Assignee: International Paper Company, New York, N.Y.

[21] Appl. No.: 44,417

[22] Filed: Jun. 1, 1979

Related U.S. Application Data

[60] Division of Ser. No. 943,772, Sep. 20, 1978, Pat. No. 4,177,936, which is a continuation of Ser. No. 803,970, Jun. 6, 1977, abandoned.

[51] Int. Cl.³ ............................. B31F 1/22; B31F 1/32
[52] U.S. Cl. ..................................... 156/207; 156/210; 229/DIG. 2; 229/DIG. 4; 229/3.5 R; 493/97; 493/381
[58] Field of Search ........................ 156/205, 207, 210; 229/3.5 R, DIG. 2, DIG. 4; 428/124; 93/36.01

[56] References Cited

U.S. PATENT DOCUMENTS

| | | | |
|---|---|---|---|
| 2,674,299 | 4/1954 | Bruker | 156/205 |
| 2,686,555 | 8/1954 | Howard | 156/205 |
| 2,710,134 | 6/1955 | Schroeder | 229/DIG. 2 |
| 2,759,523 | 8/1956 | Goldstein et al. | 156/207 |
| 2,949,151 | 8/1960 | Goldstein | 156/207 |
| 3,784,430 | 1/1974 | Gilbert et al. | 156/207 |
| 3,913,822 | 10/1975 | Heaps | 229/DIG. 4 |

*Primary Examiner*—Jerome W. Massie
*Attorney, Agent, or Firm*—James F. Haley, Jr.

[57] ABSTRACT

An improved method of and machine for making a bulk container. The container has a main body which is strengthened as compared to at least the container top or bottom by at least one additional material layers, these material layers comprising in combination a single face liner and attached fluting medium. The variable layer construction being accomplished by machine combination of material layers of different cross-machine dimension. The method of this variable dimension multi-layer combination encompasses a single lamination step of the several material layers to provide a strengthened bulk container blank and therefrom the improved container of this invention.

4 Claims, 4 Drawing Figures

METHOD FOR MAKING AN IMPROVED VARIABLE FLUTE CONTAINER

This is a division of application Ser. No. 943,772, filed Sept. 20, 1978 now U.S. Pat. No. 4,177,936, which itself is a continuation of application Ser. No. 803,970, filed June 6, 1977, now abandoned.

BACKGROUND OF THE INVENTION

This invention relates to machines and methods for making bulk containers and the containers made therefrom. More particularly, it is directed at a novel method and machine for making a bulk container and the container made therefrom characterized by a main body which is strengthened as compared to at least the container top or bottom by additional material layers.

Corrugated paperboard containers are often used to package and ship a variety of bulk products. Usually these containers are constructed of fiberboard, paperboard, cardboard and the like. Often, they are waxed or treated with other materials to attain desired waterproofing and other characteristics. They may take many forms and may be used for many purposes—they may consist of folding boxes or cartons, packing or shipping containers, collapsible and rigid casings and containers including transfer file cases, storage boxes, portable ward-robes, insulated containers, and other forms which are well known in the art. Examples of such containers are disclosed in U.S. Pat. Nos. 1,704,174, 2,276,363, 2,751,964, and 3,864,200.

Typically, these paperboard containers are reinforced along the edges or fold-score lines to strengthen the composite construction and preclude corner and edge damage during handling. Such protection commonly takes the form of bonding tape-like reinforcing strips about the fold lines of the blank prior to container formation. Exemplifying this type of construction are U.S. Pat. Nos. 1,425,914 and 1,600,396. Another corner reinforcement technique, disclosed in U.S. Pat. No. 1,410,622, is characterized by longitudinal folds or pleats in one of the webs of container blank. These special pleats in the zones of the fold lines of the container blank afford integral corner reinforcement and a neat appearance to the formed box.

These construction methods, while of use in strengthening the edges of the formed container, do not provide that high compressive strength needed in the packaging of heavy articles which are incapable of withstanding compressive force. Such packages tend to bulge when stacked one upon the other. Moreover, they are likely to be damaged by side panel shocks and jars.

One method to increase the lateral strength of paperboard containers comprises stiffening that corrugated paperboard employed to form the container. Such technique, disclosed in U.S. Pat. No. 3,586,564, makes use of plastic which is capable of withstanding compressive force without bending. The plastic is formed into narrow strips and dropped into the corrugated flutes at desired intervals. The resultant blank in materially stiffened in a direction parallel to the flutes. It permits a container construction which displays desired high compressive strength and lateral protection. However, this construction requires specialized apparatus for feeding and correctly positioning the narrow plastic strips on the flutes of the corrugated medium. Moreover, the use of plastic increases the cost of the formerly paper container.

Another method which enhances the compressive strength of a paperboard container and better protects its contents against lateral jars and shocks is disclosed in U.S. Pat. No. 1,550,646. There, a lining, preferably of corrugated paper or cardboard, is inserted into the container before use. This lining is characterized by double-ply top and bottom edges and a single-ply central portion. This center portion comprises a corrugated paper or cardboard core sandwiched between two liner sheets. On insertion, this construction provides a container having an air space between its outer side walls and the central portion of the liner. The formed inner air space cushions the packaged material from any lateral shocks and jars. The liner itself strengthens the compressive resistance of the box.

Although this method avoids those disadvantages inherent in the use of plastic stiffening material, it requires off-machine liner formation and resultant insertion in a formed box. Additionally, should it be desired to laminate the liner to the box, a further lamination step would be necessary. As regards the container itself, that air space separation between the container outer walls and the central portion of the liner reduces substantially the compressive and bulging resistance of the combination.

Other lining techniques are known in the prior art. These include the lamination of a single face liner-fluting-single face liner combination to the main body of the container. Such techniques require a second lamination step. Importantly, they also require an inner single face liner surface to correctly position the glue lines prior to lamination.

SUMMARY OF THE INVENTION

Accordingly it is an object of this invention to provide a machine for and method of making a bulk container, which container is characterized by a main body which is strengthened as compared to at least the container top or bottom by at least one additional material layer, this layer comprising in combination, a single face liner and attached fluting medium.

It is another object of this invention to provide a bulk container of variable layer construction which better resists compressive force to avoid bulging when packaged heavy articles are stacked one upon the other.

It is a further object of this invention to provide a bulk container which is characterized by a strengthened main body to better protect the packaged goods from lateral shocks and jars during handling.

It is still another object of this invention to provide a machine and method for forming the novel variable dimension multi-layer container of this invention on line such that only a single lamination step is required.

These objects and others which are apparent from the disclosure herein are accomplished by a container which is characterized by a main body having at least one additional material layer, comprising in combination a single face liner and attached fluting medium, as compared to at least the container top or bottom. The additional layers are laminated to the container blank simultaneously to its formation.

The machine and method of this simultaneous formation provide a means of combining several material layers, at least one of which has a smaller cross-machine dimension than the others. By employing these webs of varied cross-machine dimension, this machine and method permit construction of a blank having a main body, which is strengthened as compared to at least the blank top or bottom by one or more additional material layers, said material layers comprising in combination a single face liner and attached fluting medium. The container of this invention is constructed in a single combination and lamination step. Therefore, the method and machine avoids the disadvantages inherent in the prior art plasticizing of blanks or lining of formed containers. The container formed from the novel blank displays good compressive strength and resists bulging when packaged heavy but compressible articles are stacked one upon the other. Moreover, the container displays good lateral strength so as to protect the packaged goods from lateral shocks and jars during handling.

DESCRIPTION OF THE PREFERRED EMBODIMENTS

Figure 1:
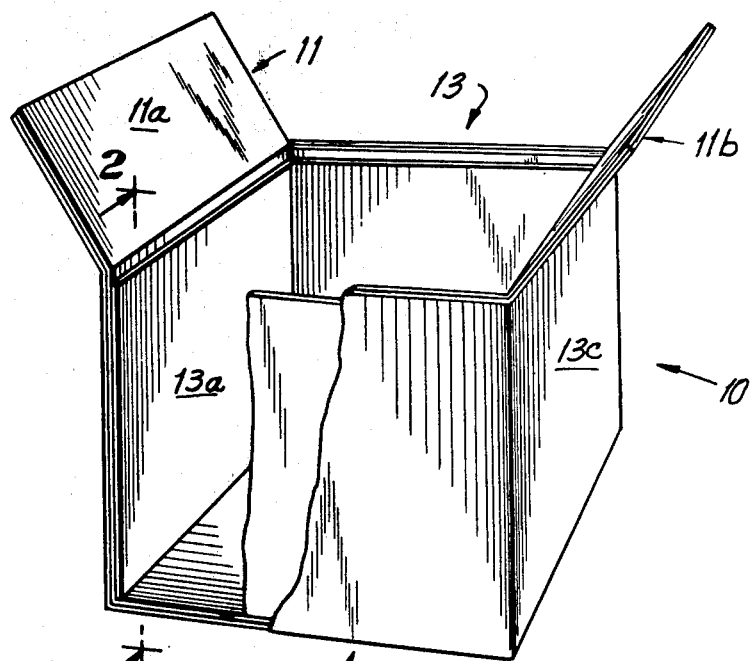
FIG. 1. is a perspective view of a container of this invention formed of corrugated paperboard material, parts being broken away for purposes of clarity.

Referring to FIG. 1 of the drawings, there is shown therein a container 10 of this invention. For the purposes of clarity two top flaps are shown as representative of the top portion of the container. It is however to be understood that the top and bottom portions of the containers of this invention may comprise any of those combinations familiar to the art. Moreover, while the depicted construction utilizes conventional corrugated paperboard, it is to be understood that other well-known packaging materials can likewise be employed. Those skilled in the art will recognize the selection of specific materials from such corrugated packaging materials as fiberboard, cardboard, paperboard, and the like so as to attain desired packaging characteristics specific to the articles packaged. While container 10 is displayed as a box in FIG. 1, other well-known packaging forms are equally amenable to that improvement which characterizes this invention, the particular shape of container being most controlled by its expected use.

Container 10 is formed from a blank by well-known container methods. As depicted it comprises top portion 11, bottom portion 12 (shown closed in FIGS. 1 and 2), and a four sided main body 13. The top portion for purposes of illustration is shown as two flaps 11a and 11b. Each top flap is integral with opposing sides of the main body. Thus, as shown in FIG. 1, top flap 11a is integral with main body side 13a and top flap 11b is integral with main body side 13c, sides 13a and 13c being opposite sides of the container.

Figure 2:
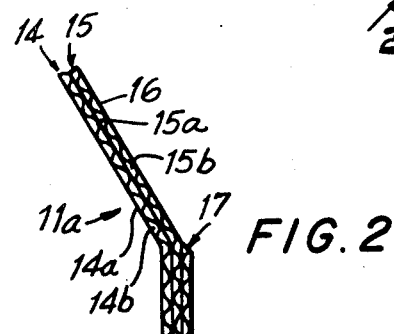
FIG. 2 is a section view along lines 2—2 of FIG. 1 of a container of this invention.

As best illustrated in FIG. 2, top portion 11 preferably comprises two material layers 14 and 15 capped with a double faced liner 16. For the purposes of this description a material layer is taken to mean the combination of a single face liner and attached fluting medium. Each material layer 14 and 15 comprises a single face liner 14a and 15a and attached fluting 14b and 15b, the unattached side of fluting 14b being joined to the unfluted side of liner 15a. This remaining uncovered fluting 15b is capped by double faced liner 16. The method of producing such fluting liner combinations are well-known in the art. While in the embodiments depicted in FIG. 2, bottom portion 12 is of similar layer construction to top portion 11, it is to be understood that this parallelism is not necessary. Rather, the top portion may be formed of a different number of material layers than the bottom, i.e. top portion 11 may comprise two material layers and bottom portion 12 may comprise three material layers. For the purposes of this description, the construction of the top or bottom portion having the least number of material layers is termed the basic container blank.

That portion of the container between the top portion and the bottom portion and integral therewith is termed the main body. In accordance with this invention the main body, of the same initial uncapped material layer construction as the basic container blank, is strengthened as compared to at least the top or bottom portion by at least one additional material layer. In FIG. 2, this reinforcement is illustrated by additional material layer 17, comprising single face liner 17a and attached fluting 17b. Such additional material layers are situated by the improved method and machine of this invention preferably adjacent a material layer of the basic container blank between such material layer and the double faced liner capping. Hence, the container of this invention is not merely a conventional container with an insert comprised of single face liner-fluting-single face liner added to the main body atop the double face liner. Here, the reinforcing is only a single face liner and attached fluting. And, it is inserted preferably between fluting 15b and double faced liner 16.

It is to be understood that similar reinforcement of the top portion or the bottom portion of the basic blank but not both is also contemplated by this invention. Such an embodiment is depicted in FIG. 3.

While only a single material layer of main body reinforcing is illustrated in FIGS. 1 and 2 multiple reinforcement is also possible. Such an embodiment is shown in FIG. 3. There, top portion 18 comprises a single material layer 18. This layer comprising single face liner 18a and fluting 18b is capped at 18b by double faced liner 18c. This basic blank is reinforced in both the main body 19 and bottom portion 20. The main body is reinforced by three additional material layers 21, 22, and 32 and the bottom portion is reinforced by a single corrugated material layer 21. Main body reinforcing material layers 21, 22, and 32 comprise single face liners 21a, 22a, and 32a and fluting 21b, 22b, and 32b attached thereto. They are attached to material layer 18 of the basic blank between this layer and double faced liner 18c. Thus, the reinforced main body of the container comprises four material layers of single face liner-fluting combinations 18a–b, 21a–b, 22a–b, and 32a–b capped by double faced liner 18c. The fluting material of each such layer is sandwiched between single facers, the final exposed fluting layer 32b being capped by the double faced liner 18c. Bottom portion reinforcing material layer 21 comprises fluting 21b and single face liner 21a. It is attached to the uncapped basic blank, material layer 18, liner 21a on fluting 18b. The combination is then capped with double face liner 18c.

Figure 3:
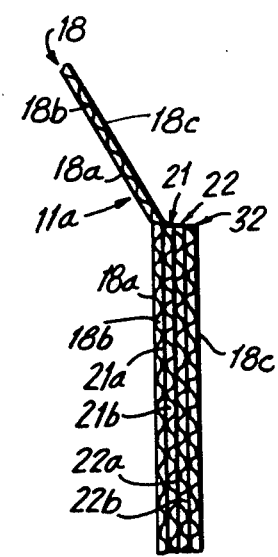
FIG. 3 is a similar view to FIG. 2 of another embodiment of this invention.

In those preferred embodiments depicted in FIGS. 2 and 3, the reinforcement is laminated between the material layer of the basic blank and the double faced liner. However, the reinforcement could as well be positioned on the outer container surface of the basic blank or less preferably intermediate to one or more material layers of the basic blank. In this intermediate positioning embodiment all of the smaller dimensioned material layers must be positioned in so-called dimensional congruence with each other. That is each must bear the same relative positioning to the larger material layers.

Figure 4:
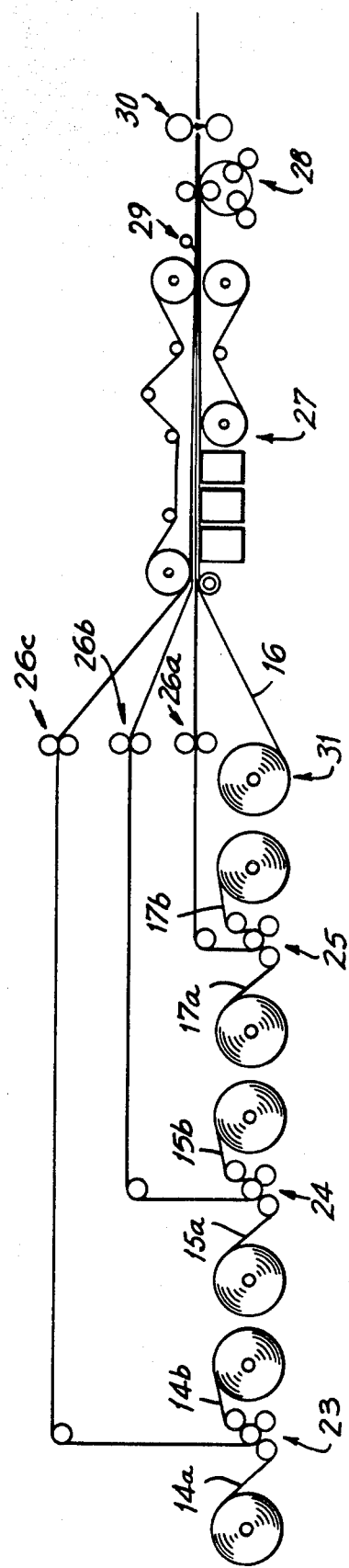
FIG. 4 diagrammatically illustrates the machine and method according to this invention for forming a container like that depicted in FIG. 1.

Referring to FIG. 4, a diagram of a preferred machine and method for forming the preferred containers of this invention is shown. The apparatus differs from conventional corrugated paperboard container machines in that a material layer, a single face liner-fluting combination, of smaller cross-machine dimension is combined with the more normal material layer components of a corrugated container prior to their gluing and lamination together. As illustrated, this machine and method afford construction of that container, whose edge is depicted in FIG. 2 by a combination of several multi-dimensional layers. A first material layer is formed at single facer 23 by the conventional combination of single face liner 14a and single face fluting medium 14b. Such fluting medium is formed from paper stock by methods well-known in the corrugation art. A second material layer, having the same cross-machine dimension as the first such layer is formed by a similar combination of single face liner 15a and fluting medium 15b at single facer 24. A third material layer, having a smaller cross-machine dimension than the first two such layers is formed at single facer 25 from single face liner 17a and fluting medium 17b. The difference between the cross-machine width of this material layer and the others is equal to that portion of the first layers which will correspond to at least the top or bottom portions of that container formed from the blank. More preferably, the dimension of this smaller material layer corresponds to the size of the main body.

Glue is applied to each of the material layers in a conventional manner at gluing stations 26a, 26b, and 26c, respectively. Then, the three material layers are combined in a sandwich-like fashion fluting 14b on liner 15a and fluting 15b on liner 17a. This sandwich construction insures that no single face liner is in surface contact with another single face liner and no fluting medium is in surface contact with another fluting medium. Simultaneously, fluting 17b, the remaining uncovered fluting, is capped by double face liner 16, supplied from web 31. The composite blank is then laminated together in double facer 27, the initial adhesive bonds being cured with heat in a conventional manner.

The combination blank may be trimmed to appropriate cross-machine dimension and cut to length using a conventional cutting means. Conventional uni-dimension blanks require only passage through triplex slitter/scorer 28 to attain that correct cross-machine dimension and crease embossment for final container formation. However, the multi-dimensional blanks of the instant invention require passage through auxiliary slitters to trim the smaller dimension material layers in the cross-machine dimension, one slitter being required for each such smaller dimensioned layer. Preferably, such auxiliary slitters are located near the standard triplex slitter/scorer so as to better utilize the existing trim removal system. However, it should be understood that those auxiliary slitting means for trimming the smaller dimensioned material layers to be combined intermediate to the larger dimensioned layers may be positioned anywhere between the single facer forming the smaller layer and the double facing means. Conversely, those auxiliary slitting means for trimming the smaller dimensioned layers not to be combined intermediate the larger layers may be located anywhere between that single facer and the final cutting means.

In the preferred embodiment illustrated in FIG. 4 the composite blank passes through auxiliary slitter 29 to trim smaller dimension layer 17a–17b in the cross-machine dimension and then through standard triplex slitter/scorer 28 to trim the other single-face webs in the cross-machine dimension and emboss the creases that form the bends in the final corrugated container. Finally, the trimmed blank is cut to length by the rotary cut-off knife 30.

While we have hereinbefore presented a number of embodiments of our invention, it is apparent that our basic construction can be altered to provide other embodiments which utilize our invention. Thus, it will be appreciated that the scope of our invention is to be defined by the claims appended hereto rather than the specific embodiments which have been presented hereinbefore by way of example.

We claim:

1. In a method of reinforcing a corrugated web comprising the steps of forming a fluting medium from a web of flat paperboard and forming at least one of a first material layer consisting of in combination a single face liner and a fluting medium attached thereto, the improvement comprising:

forming at least one of a second material layer consisting of in combination a single face liner and a fluting medium attached thereto, said second material layer having a dimension in the cross machine direction of less than that of said first material layer, said difference in dimension between said first and said second material layers being equal to that portion of said first material layer forming at least one of the top portion and bottom portion of a container formed from said reinforced corrugated web; and forming a combination consisting of said first material layers and said second material layers, said combination having no single face liner in contact with another single face liner and no fluting medium in contact with another fluting medium; and capping the sole remaining uncovered fluting medium of said combination with a double faced liner.

2. The method of claim 1 including the further step of trimming the cross machine dimension of each of said first material layers and each of said second material layers.

3. The method of claim 1 including the further step of cutting said web in a cross-machine direction to form a blank.

4. The method of claim 1 including the step of slotting and creasing the web parallel to the corrugations.

* * * * *